Sept. 19, 1961   R. J. DIXON ET AL   3,000,516
APPARATUS FOR AUTOMATICALLY TRANSFERRING WORKPIECES
TO AND FROM A LATHE OR OTHER MACHINE TOOL
Filed Aug. 21, 1958   3 Sheets-Sheet 1

Inventors
R. J. Dixon
L. Jones
By Mason Kolving Seebold
Attys

Inventors
R. J. Dixon
L. Jones

Sept. 19, 1961     R. J. DIXON ET AL     3,000,516
APPARATUS FOR AUTOMATICALLY TRANSFERRING WORKPIECES
TO AND FROM A LATHE OR OTHER MACHINE TOOL
Filed Aug. 21, 1958     3 Sheets-Sheet 3

United States Patent Office 3,000,516
Patented Sept. 19, 1961

3,000,516
APPARATUS FOR AUTOMATICALLY TRANSFERRING WORKPIECES TO AND FROM A LATHE OR OTHER MACHINE TOOL
Reginald John Dixon, Solihull, and Lewis Jones, Coventry, England, assignors to Wickman Limited, Coventry, England
Filed Aug. 21, 1958, Ser. No. 756,369
Claims priority, application Great Britain Aug. 31, 1957
2 Claims. (Cl. 214—1)

This invention relates to apparatus for automatically transferring work-pieces to and from a lathe or other machine tool of the kind which includes a rotary headstock for carrying a plurality of work-pieces and adapted to be rotated intermittently about a horizontal axis, and particularly machine tools of the said kind which are commonly known as multi-spindle automatics.

An apparatus in accordance with the invention comprises in combination with the headstock, a downwardly inclined feed chute for conveying a plurality of work-pieces in succession to a loading position spaced from the headstock both laterally and in the axial direction thereof, means for controlling intermittent movement of the work-pieces by gravity along the chute, an angularly and rectilinearly oscillatable arm for transferring the work-pieces individually from the chute to the headstock, and from the latter to another position, means for actuating the arm in co-ordination with the intermittent movements of the headstock and work-pieces, a second chute spaced from the headstock both laterally and in the axial direction thereof for receiving work-pieces delivered by the arm to the last mentioned position, means pivotally supporting the second chute, fluid-actuated means for intermittently moving the second chute through 180° about its pivot axis to reverse positions of work-pieces transferred thereto by the arm from the headstock, a second angularly and rectilinearly oscillatable arm for transferring work-pieces individually from the second chute back to the headstock following the work-piece reversing movements of the second chute, and for subsequently transferring the reversed work-pieces from the headstock to a discharge position, means for actuating the second arm in co-ordination with the movements of the headstock and the second chute, and a discharge chute spaced from the headstock in the axial direction thereof for receiving the work-pieces delivered by the second arm to the discharge position.

Figure 1:
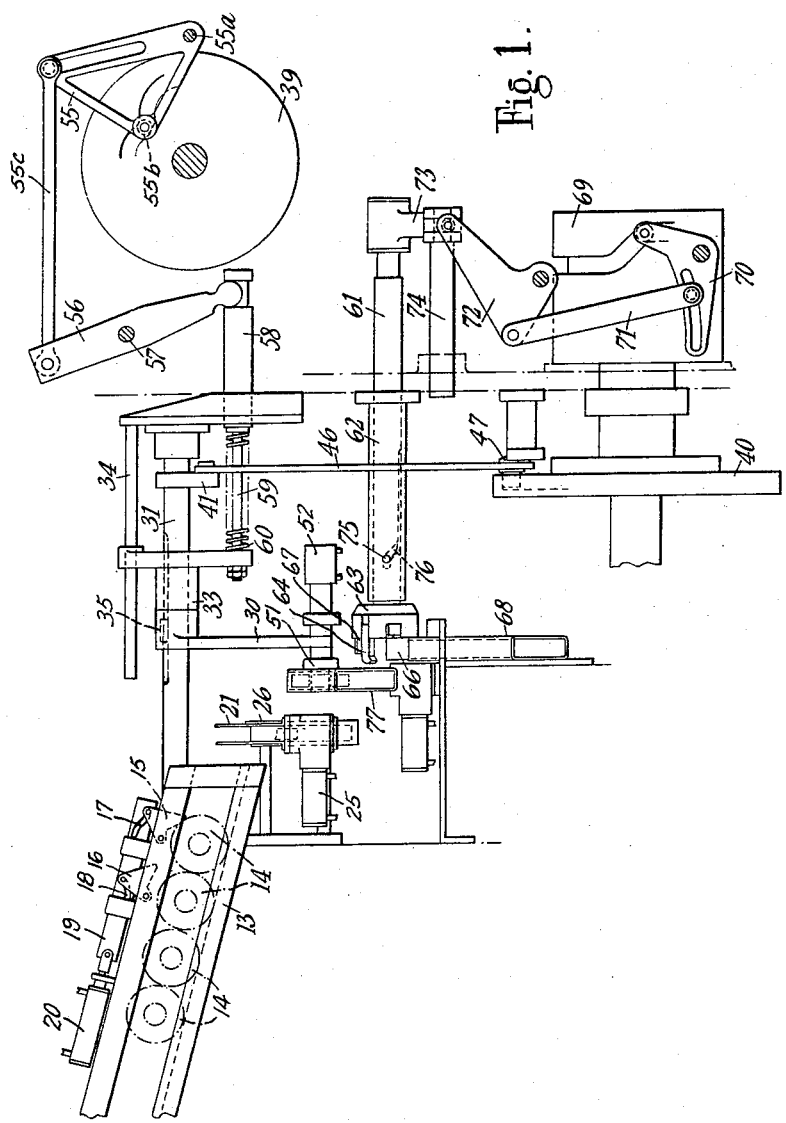
FIGURES 1 and 2 are respectively a front and end elevation of a mechanism embodying the invention.
Figure 2:
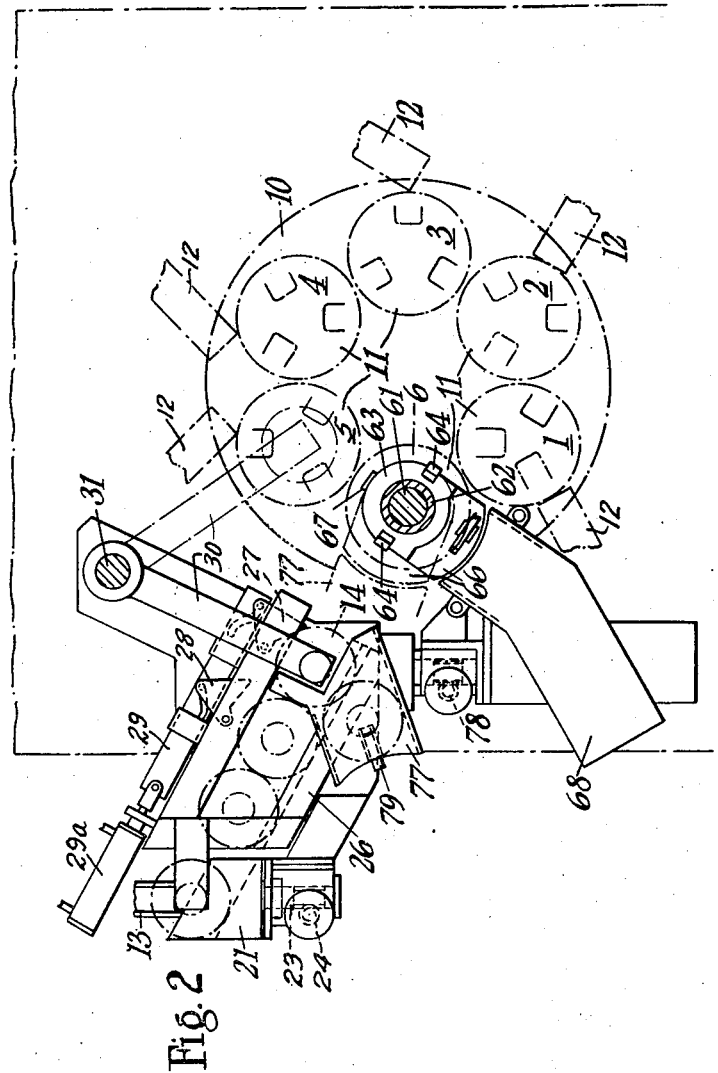

A known form of multi-spindle automatic machine for which the invention is required is illustrated schematically and by dotted lines in FIGURES 1 and 2. It includes a rotary headstock 10 (FIGURE 2) provided with six equi-spaced rotary chucks 11. The headstock is moved intermittently through 120° so that a work-piece is carried thereon through a cycle of operations successively from position to position. That is to say, when performing operations on one face of the work-piece, the successive positions are those marked 1, 3, 5, and after reversal of the work-piece and replacement on the headstock the successive positions are those marked 2, 4, 6, the finished work-piece being discharged from position 6. Adjacent to each of five of such positions there is mounted on the frame of the machine a holder 12 for the tools which perform the desired operations on the work-pieces. The work-piece is inserted and removed at the position marked 6.

The feed-apparatus in accordance with the invention for such a machine comprises a feed chute 13 adapted to accommodate a series of any desired number of work-pieces 14 of annular disc form. This chute is downwardly inclined so that the required movement of the work-pieces along the chute can be effected by gravity. The chute is mounted on the front of the frame of the machine so that it extends in a plane parallel with the rotation axis of the headstock 10. For controlling the intermittent movements of the work-pieces along the chute, there are mounted on its lower end two pivoted stops 15, 16. The stops have formed on or attached to them laterally projecting pegs which respectively engage cam grooves 17, 18 in a reciprocatory stop-actuating slide 19. This slide is actuated by an air-operated piston in a cylinder 20 to which motive air is supplied through valves which are automatically actuated at appropriate intervals by a rotary cam (not shown). The arrangement is such that the work-pieces are normally held stationary by the action of the stop 15 on the leading work-piece. When it is required to release this work-piece the associated stop 15 is moved away from the work-piece and at the same time the stop 16 is moved into position for arresting the next work-piece. On release of the first work-piece it passes out of the chute by gravity. The stop pieces are then returned to their previous position, so enabling the second work-piece to advance by gravity into contact with the stop 15, these operations being automatically repeated at appropriate intervals.

Figure 1A:
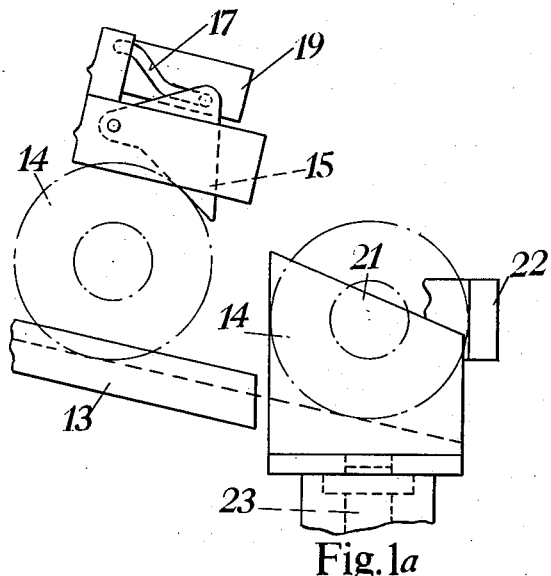
FIGURE 1a is a fragmentary front view illustrating in another position from that shown in FIGURE 1, a rotary gate forming a part of the feed chute.

The work-piece which has been released from the chute 13 passes into a gate 21 which initially occupies the position shown in FIGURE 1a in alignment with the adjacent end of the chute 13. The work-piece received by the gate is arrested by a stop 22 extending from another feed chute to be hereinafter described. The gate is reversibly rotatable through 90°. Actuation of the gate may be effected by any convenient means the operation of which is automatically co-ordinated with the actions of the machine. In the example illustrated, the gate is carried by a spindle 23 (FIGURE 2) on which is formed a toothed segment engaged by a slidable toothed rack 24, the latter being operable by compressed air acting on a piston in a cylinder 25 (FIGURE 1), the motive air being supplied through cam-operated valves (not shown).

Figure 2A:
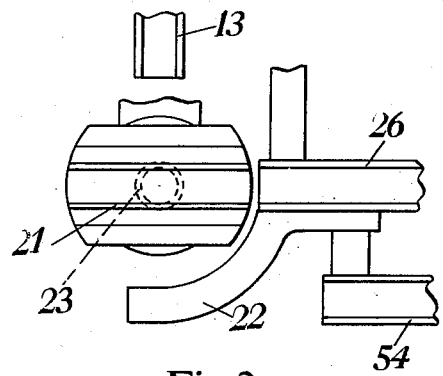
FIGURE 2a is a plan of gate.

The gate 21 is located between the discharge end of the chute 13, and the entrance end of a second and downwardly inclined feed chute 26 (FIGURES 1, 2 and 2a) which is mounted at right angles to the chute 13. After the gate has received a work-piece from the chute 13 the gate is rotated through 90°, and as it has an inclined base, the work-piece is then free to pass from the gate by gravity into the chute 26 which is provided with pivoted stops 27, 28 of analogous form and function to stops 15, 16 and actuated analogously by a reciprocatory slide 29 and the action of motive air on a piston in a cylinder 29a mounted on the chute 26. The stop 27 is the lower stop and temporarily arrests the work-piece at the discharge end of the chute 26 as shown in FIGURE 2.

The purpose of the chute 26 is to convey the work-piece to a position at which it can be engaged by a first work-piece transfer member in the form of an oscillatory transfer arm 30 whereby it can be transferred to one of the chucks temporarily occupying position 5 on the rotary headstock. The arm is reciprocable on and keyed to a shaft 31 which is angularly movable. On the shaft is supported a slidable sleeve 33 which is held against rotation by a fixed guide bar 34, and the arm is connected with angular freedom of movement to one end of the sleeve. Also the arm is connected to the shaft by a key 35 which is slidable in a groove in the shaft. The sleeve is connected to a thrust rod 59 surrounded by a spring 60 and secured to a slide 58. The latter is movable by the action of a rotary cam 39 upon intermediate linkage consisting of a rocker arm 55 pivoted at 55a and connected by a peg 55b to the cam and by a link 55c to another rocker arm 56 pivoted at 57 and engaged with the slide 58. Hence, the cam 39 serves to slide the sleeve 33 on the shaft 31 and thereby impart lateral movements to the arm 30.

Angular movements of the arm 30 between the positions shown in full and dotted lines in FIG. 2 are effected by angular movements of the shaft 31. This shaft is actuated by a rotary face cam 40. On the shaft is secured an arm 41 which is connected by a link 46 to an arm 47 actuated by the cam 40.

Figure 3:
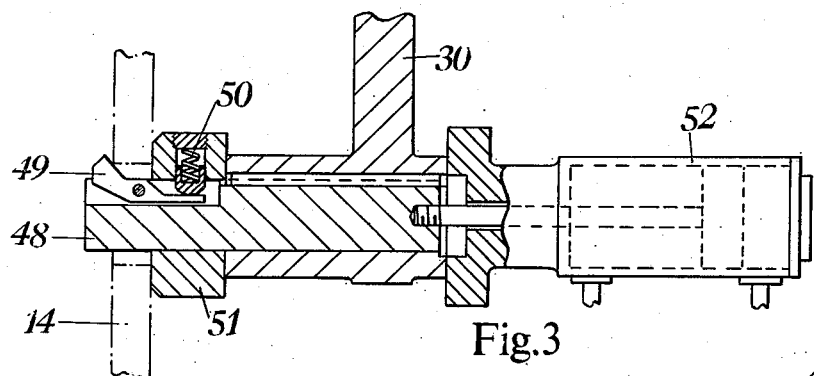
FIGURE 3 is a part sectional front elevation illustrating in fuller detail than FIGURE 1, the operative end of the oscillatory work-piece transfer arm.

At the free end of the transfer arm 30 is provided a work-piece gripper 48 (FIGURE 3) adapted to extend through the central hole of the work-piece 14, and provided with a finger 49 loaded by a spring 50, the work-piece being held between the finger and a collar 51 on the gripper.

When it is not convenient to effect the whole of the axial movement of the gripper 48 by the cam 39, there is mounted on the free end of the arm a cylinder 52 containing a piston which can exert an axial force on the gripper which in this case is slidably carried by the arm.

In the foregoing it has been assumed that the work-pieces are of annular form. Work-pieces of solid disc form can be dealt with in like manner by providing the work gripper on the oscillatory arm with fingers adapted to grip the peripheries of the work-pieces.

The above arrangement will enable work-pieces to be transferred singly to and from the headstock as hereinafter described and operations to be performed on one side of each work-piece.

To enable operations to be performed on both sides of the work-pieces, the arrangement further includes a work-piece reversing chute 77 rotatable through 180°, and operable by an air actuated rack mechanism 78 (FIGURE 2) similar to that employed for rotating the gate 21. The reversing chute 77 serves to carry the workpieces singly to a guide 66 on a gripper head of a second work-piece transfer member in the form of an axially slidable transfer shaft 61 which will now be described.

Figure 4:
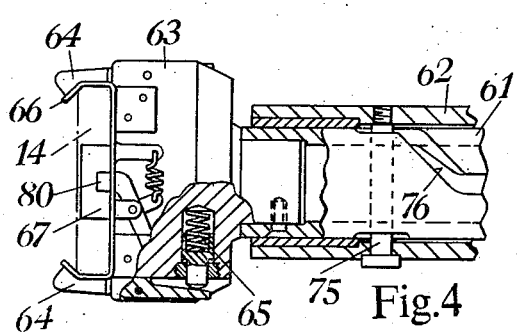
FIGURES 4 and 5 are respectively a part-sectional side elevation and plan illustrating the operative end of the axially slidable work-piece transfer shaft employed in the mechanism shown in FIGURES 1 and 2.
Figure 5:
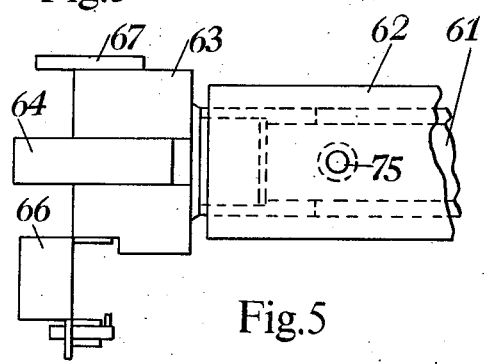

The transfer shaft 61 is also angularly movable and is carried by a fixed sleeve 62. On one end of this shaft is carried a work-piece holder 63 provided with a pair of fingers 64 loaded by springs 65. This holder is also provided with the guide 66 which is open at its front side. Also the work-piece holder is provided with a stop 67 which serves to hold the work-piece in position until the shaft 61 is rotated to the position at which the work-piece can fall out through the guide 66 to a discharge chute 68 (FIGURE 2). Axial movements of the shaft 61 are effected by a rotary cam 69 acting on a rocker arm 70 which is connected by a link 71 to another rocker arm 72 (FIGURE 1), the latter being connected to a coupling 73 carried on the rear end of shaft 61, and the coupling being attached to a slidable rod 74. Angular movement of the shaft is effected by engagement of a peg 75 on the sleeve 62 with a cam slot 76 formed in the shaft 61 (FIGURES 4 and 5).

Assuming that one side of a work-piece has already been subjected to operations at positions 1 and 3 by intermittent rotation of the headstock 10 and that the partly finished work-piece has reached the position marked 5 in FIGURE 2, the first action to be performed by the transfer arm 30 is to remove the work-piece from the headstock. This is effected by lateral movement of the arm partly by the cam 39 and (in the present example) partly by the piston in the cylinder 52, causing the work-piece gripper 48 to engage the work-piece. Retraction of the arm then removes the work-piece from the chuck which previously held it. An angular movement is then imparted to the arm, by the action of the cam 40, causing the arm to convey the work-piece to the entrance end of the reversing chute 77 (FIGURE 2). Lateral movement of the arm 30 causes the work-piece to be stripped off the work gripper on the arm by a gapped end of the chute 77, leaving the work-piece free to roll down to the lower end of this chute where it is retained by a spring loaded catch 79. While the shaft 31 is still holding the arm 30 in its present position, a lateral movement of the arm causes the work gripper to pass through the gapped end of the reversing chute into engagement with a new work-piece already awaiting it in the feed chute 26. After the gripper has engaged this work-piece the stop 27 is raised to an unobstructive position, and an angular movement is then imparted to the arm for carrying the work-piece into a position adjacent to the chuck waiting for it in position 5. The arm is then advanced for placing the work-piece on the chuck. After the chuck has secured the work-piece, the arm is withdrawn. The headstock is now actuated for carrying the work-piece to position 1. In so doing it carries a work-piece finished on one side from position 3 to position 5, when the above described sequence of actions of the arm is repeated.

Between the engagement of the new work-piece just described and the withdrawal of the arm, the reversing chute 77 is rotated through 180° to bring its lower end into alignment with the guide 66 on the axially movable transfer shaft 61. By contact with one side of the guide, the catch 79 releases the work-piece, so allowing it to roll through the guide 66 to the work holder 63, the rotation of the chute 77 having reversed the work-piece. The chute 77 is then returned to its previous position. At this stage the shaft 61 is moved to convey the work-piece to position 6, the previously completed work-piece having been already removed from this position by the said shaft. The reversed work-piece now passes through positions 2 and 4 where operations are performed on its other face. Later the work-piece reaches position 6 where it is removed from the headstock and conveyed by axial movement of the transfer shaft 61 to a position opposite the entrance end of the discharge chute 68. In this movement of the shaft 61 the interaction of the peg 75 and cam slot 76 causes an angular movement to be given to the shaft, causing the open end of the guide 66 to be moved through about 75° into co-incidence with the entrance of the discharge chute. During this movement of the guides 66 the work-piece is retained therein by a spring-loaded catch 80 which, when the open end of the guide approaches the entrance end of the discharge chute 68, is actuated by contact with an abutment (not shown) on the discharge chute to release the work-piece which then rolls through the guide 66 into the chute 68 and thence discharged from the machine. Meanwhile the new work-piece inserted at position 5 is carried through positions 1 and 3 and when it reaches position 5 it is transferred to position 6, and after passing through positions 2 and 4, it is discharged from the machine on again arriving at position 6.

It will be understood that the actions of the cams 39, 40, 69 and 76, the various stops, the gate 21, and the reversing chute 77 are suitably co-ordinated with the intermittent movements of the headstock, to effect automatic conveyance of the work-pieces to and from the machine, rotation of the cams and headstock being obtained from a main shaft through the medium of gearing (not shown).

Having thus described our invention, what we claim as new and desire to secure by Letters Patent is:

1. Apparatus for automatically transferring work-pieces to and from a machine of the kind which includes a rotary headstock for carrying a plurality of work-pieces and adapted to be rotated intermittently about a horizontal axis, comprising in combination with the headstock, a downwardly inclined feed chute for conveying a plurality of work-pieces in succession to a loading position spaced from the headstock both laterally and in the axial direction thereof, means for controlling intermittent movement of the work-pieces by gravity along the chute, an angularly and rectilinearly oscillatable arm for transferring the work-pieces individually from the chute to the headstock, and from the latter to another position, means for actuating the arm in co-ordination with the intermittent movements of the headstock and work-pieces, a second chute spaced from the headstock both laterally and in the axial direction thereof for receiving work-pieces delivered by the arm to the last mentioned position, means pivotally supporting the second chute, fluid-actuated means for intermittently moving the second chute through 180° about its pivot axis to reverse positions of work-pieces transferred thereto by the arm from the headstock, a second angularly and rectilinearly oscillatable arm for transferring work-pieces individually from the second chute back to the headstock following the work-piece reversing movements of the second chute, and for subsequently transferring the reversed work-pieces from the headstock to a discharge position, means for actuating the second arm in coordination with the movements of the headstock and the second chute, and a discharge chute spaced from the headstock in the axial direction thereof for receiving the work-pieces delivered by the second arm to the discharge position.

2. Apparatus as claimed in claim 1 wherein the second arm comprises an axially slidable and angularly movable shaft having work-piece gripping means on one end thereof, and has combined therewith a cam for imparting axial movements to the shaft, and a cam-like device for imparting angular movements to the shaft in response to axial movement thereof.

References Cited in the file of this patent

UNITED STATES PATENTS

| | | |
|---|---|---|
| 1,347,851 | Haefele | July 27, 1920 |
| 1,993,754 | Smith | Mar. 12, 1935 |
| 2,811,267 | Bock | Oct. 29, 1957 |
| 2,929,499 | Turner | Mar. 22, 1960 |